United States Patent
Hamm et al.

(10) Patent No.: US 7,108,217 B2
(45) Date of Patent: Sep. 19, 2006

(54) DEVICE FOR STORING A CABLE

(75) Inventors: Silvio Hamm, Sülzfeld (DE); Manfred Prell, Burglauer (DE)

(73) Assignee: BSH Bosch und Siemens Hausgeräte GmbH, Munich (DE)

(*) Notice: Subject to any disclaimer, the term of this patent is extended or adjusted under 35 U.S.C. 154(b) by 0 days.

(21) Appl. No.: 10/739,359

(22) Filed: Dec. 18, 2003

(65) Prior Publication Data

US 2004/0262443 A1    Dec. 30, 2004

Related U.S. Application Data

(63) Continuation of application No. PCT/EP02/06593, filed on Jun. 14, 2002.

(30) Foreign Application Priority Data

Jun. 29, 2001 (DE) .......................... 201 10 821 U
Jun. 14, 2002 (EP) ..................... PCT/EP02/06593

(51) Int. Cl.
B65H 27/00 (2006.01)

(52) U.S. Cl. ................... 242/397.2; 242/377

(58) Field of Classification Search ............ 242/397.2, 242/377; 254/397
See application file for complete search history.

(56) References Cited

U.S. PATENT DOCUMENTS

| 1,747,411 A | | 2/1930 | Anderson |
| 1,908,852 A | * | 5/1933 | Lea ............................ 242/377 |
| 2,591,214 A | * | 4/1952 | Tamarin ..................... 15/323 |
| 2,770,499 A | * | 11/1956 | Rapisarda ................... 254/397 |
| 2,937,396 A | * | 5/1960 | Momberg et al. ............. 15/323 |
| 3,813,054 A | * | 5/1974 | Klingspor .................... 242/400 |
| 4,213,596 A | * | 7/1980 | Inoue et al. ................ 254/397 |
| 4,583,700 A | * | 4/1986 | Tschurbanoff ........... 242/397.2 |
| 4,616,791 A | * | 10/1986 | Harvey .................... 242/397.2 |

FOREIGN PATENT DOCUMENTS

EP          0063217          10/1982

\* cited by examiner

*Primary Examiner*—Emmanuel M Marcelo
(74) *Attorney, Agent, or Firm*—John T. Winburn; Russell W. Winburn; Craig J. Loest

(57) ABSTRACT

A device for storing a cable, especially an electric cable in a cable drum of a vacuum cleaner. The device including a pendulous body with rollers mounted on an axle and a supply space. The supply space has the rollers arranged on the entry side to guide the cable to the pendulous body. The pendulous body having at least a first and at least a second roller between which the cable can be guided as the pendulous object swings around the axle.

12 Claims, 2 Drawing Sheets

DEVICE FOR STORING A CABLE

Figure 1:
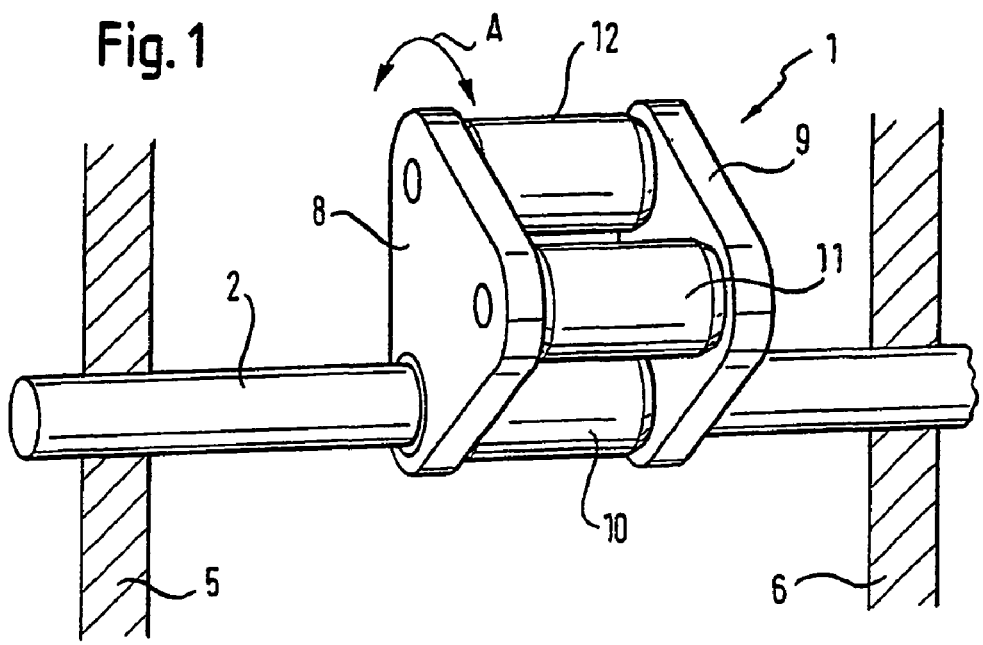

This application is a continuation of PCT/EP02/06593 filed on Jun. 14, 2002.

The invention relates to a device for storing a cable, especially an electrical cable in a cable drum of a vacuum cleaner, comprising rollers arranged on the entry side of the storage space between which the cable can be guided through and fed into the storage space.

Such a device is known from EP 0 063 217 A1. The known device which is especially suited for use in vacuum cleaners has rotating rollers or rollers arranged on the entry side of a storage space between which a cable is frictionally clamped and is thus pushed freely into the storage space such that it lays itself there in individual layers.

It is the object of the invention to improve the known device.

This object is solved according to the invention with a device of the type specified initially by the fact that inside a pendulous body which swings about an axle there is at least one first and at least one second roller between which the cable can be guided through.

In an advantageous further development of the invention the pendulous body is designed such that the rollers are formed on one side by two rollers, each mounted on an axle in the pendulous body, and on the other side by a roller holder which surrounds the axles about which the pendulous body is self-pivotable.

In a further advantageous development of the invention the pendulous body is designed such that said pendulous body has at least one supporting element arranged at the side of the first and the second roller on which the first and the second roller are mounted.

By means of the device according to the invention it is achieved that during the take up of a cable into a storage space, especially onto a cable drum, superimposed cable coils are wound tightly in the winding space such that on the one hand, the winding space is optimally used and on the other hand, no loops or knots can form inside and outside the winding space which can result in disturbances when the cable is pulled in or pulled out.

The device according to the invention forms a lead tautener which disentangles the cable loops located outside the device through its limited intake cross-section without the cable being able to become jammed in the area of the lead tautener. The lead tautener is constructed as a pendulous body which executes a swinging movement in the intake direction of the cable. The swinging movement is brought about by the cable hitting against the first or the second roller which are arranged at a certain distance from the shaft of the pendulous body. The shaft of the pendulous body is formed by a roller holder surrounding a fixed axle.

As a result of the mounting of the pendulous body, this supports an oscillating movement of the cable in conjunction with the derailleurs attached in the drum cheeks of the cable drum.

As a result of the swinging movement, the distance between the respective roller and the cable is reduced such that the cable runs along on one of the rollers and the roller holder.

In order advantageously not to cause too large swings of the pendulous body, the distance between the first and the second roller is selected to be only slightly larger than the diameter of the cable.

An optimum winding pattern of the cable in the cable drum is achieved as a result of the invention. Knotting of the cable is avoided. During withdrawal of the cable from the cable drum, a uniform withdrawal force and thus a lesser effect on the cable is achieved compared with that encountered in conventional devices for storing cables.

Figure 2:
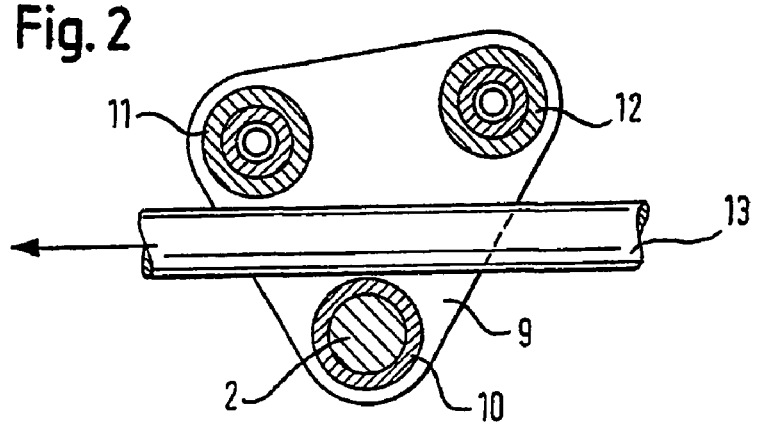
Figure 3:
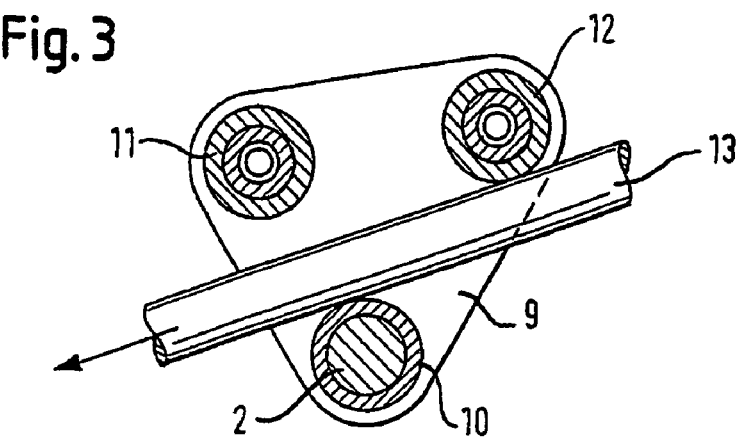
Figure 4:
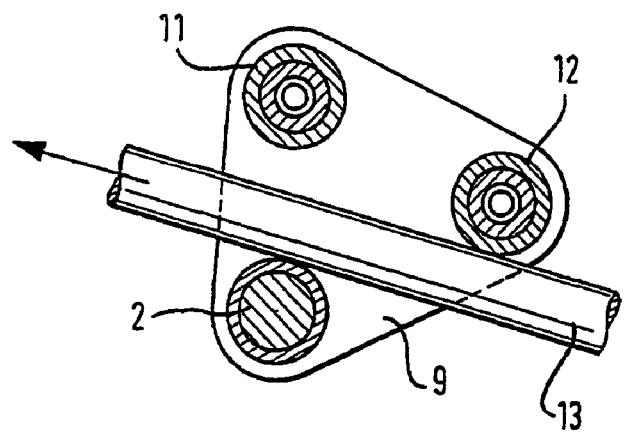
Figure 5:
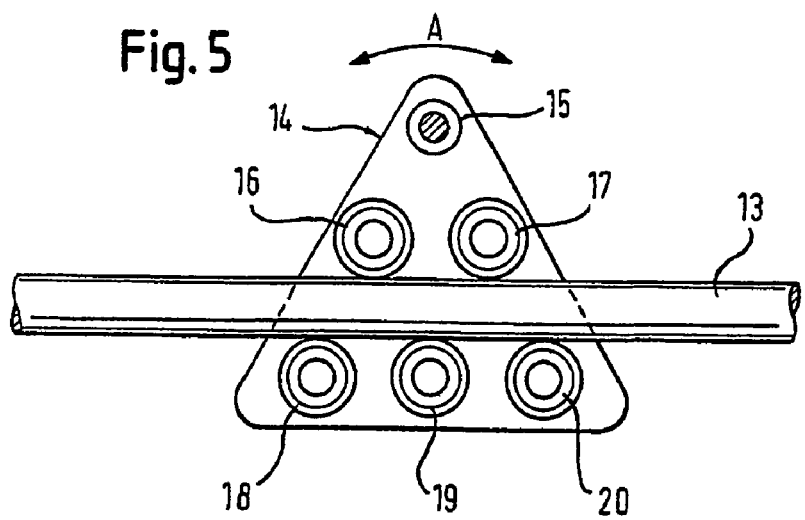
Figure 6:
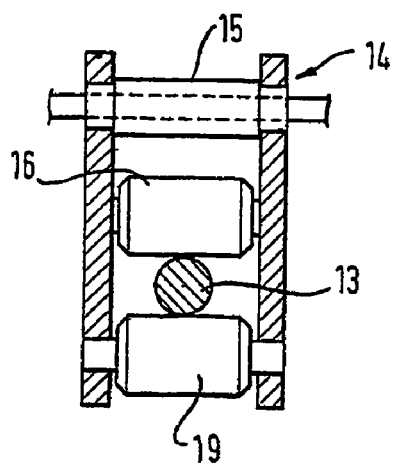

The invention is explained in further detail in the following with reference to exemplary embodiments. In the figures:

FIG. 1 shows a perspective view of a first pendulous body for use in a device for storing a cable, FIGS. 2–4 show cross-sectional views of the pendulous body from FIG. 1 in the rest position and in various swinging positions, FIG. 5 shows a cross-sectional view of a second pendulous body and FIG. 6 shows a longitudinal view of the second pendulous body.

A device for storing a cable, especially an electric cable in a cable drum of a vacuum cleaner is provided with a pendulous body 1 (FIG. 1) which is displaceably mounted with respect to a fixed axle 2 in the device and is pivotable in the direction of an arrow A.

The pendulous body 1 has two supporting elements 8, 9 which are fixedly connected to a roller holder 10. The roller holder 10 is rotatably arranged on the axle 2. In addition, rollers 11 and 12 are rotatably mounted between the supporting elements 8, 9. A cable 13 runs between the roller holder 10 on the one hand and the rollers 11 and 12 on the other hand (FIGS. 2–4). Depending on the intake angle of the cable 13 the pendulous body 1 can occupy different positions and thereby bring about a uniform tautening of the cable 13.

In another exemplary embodiment (FIGS. 5, 6) there is shown a pendulous body 14 which, in addition to a roller holder 15, has two upper rollers 16 and 17 and three lower rollers 18 to 20 between which the cable 13 runs through. The pendulous body 14 executes swinging movements about the fixed axle of the roller holder 14 (arrow A).

The invention claimed is:

1. A vacuum cleaner comprising:
   a housing;
   an electric cable retractably extending from the housing and providing electrical power from an electrical power source to the vacuum cleaner;
   a storage space disposed within the housing for receiving the electric cable;
   a cable drum disposed within the storage space for winding the electric cable;
   an axle fixedly supported by the housing adjacent the storage space;
   a pendulous body supported by the axle for pivotal movement with respect to the axle and including two supporting elements spaced apart from one another;
   at least a pair of rollers extending between the supporting elements and mounted for rotation with respect to the supporting elements, the cable extending between the axle and the rollers and generating a swinging movement of the pendulous body in response to the cable contacting the rollers; and
   wherein the pendulous body is supported by the axle for translational sliding movement in an axial direction with respect to the axle.

2. The vacuum cleaner according to claim 1, wherein each supporting element includes a triangularly shaped planar member and the two supporting elements extend substantially parallel to one another.

3. The vacuum cleaner according to claim 1, further comprising a roller holder surrounding the axle and being supported for rotation with respect to the axle, the cable being guided between the roller holder and the rollers.

4. The vacuum cleaner according to claim 3, wherein the supporting elements are fixedly connected to the roller holder.

5. The vacuum cleaner according to claim 1, wherein the rollers extend in a direction substantially parallel to the axle.

6. The vacuum cleaner according to claim 1, wherein the rollers include at least two upper rollers and three lower rollers extending between the supporting elements and mounted for rotation with respect to the supporting elements, the cable extending between the lower rollers and the upper rollers.

7. The vacuum cleaner according to claim 6, wherein the upper rollers and the lower rollers all extend in a direction substantially parallel to the axle.

8. A vacuum cleaner comprising:
a housing;
an electric cable extending from the housing and providing electrical power from an electrical power source to the vacuum cleaner;
an axle fixedly supported by the housing;
a pendulous body supported by the axle for pivotal movement with respect to the axle and including two supporting elements spaced apart from one another;
at least a pair of rollers extending between the supporting elements and mounted for rotation with respect to the supporting elements, the cable extending between the axle and the rollers; and
wherein each supporting element includes a relatively flat triangularly shaped member and the two supporting elements extend substantially parallel to one another.

9. A vacuum cleaner comprising:
a housing;
an electric cable extending from the housing and providing electrical power from an electrical power source to the vacuum cleaner;
an axle fixedly supported by the housing;
a pendulous body supported by the axle for pivotal movement with respect to the axle and including two supporting elements spaced apart from one another;
at least a pair of rollers extending between the supporting elements and mounted for rotation with respect to the supporting elements, the cable extending between the axle and the rollers; and
wherein the pendulous body is supported by the axle for translational sliding movement in an axial direction with respect to the axle.

10. The vacuum cleaner according to claim 9, further comprising a roller holder surrounding the axle and being supported for rotation with respect to the axle, the cable being guided between the roller holder and the rollers.

11. The vacuum cleaner according to claim 9, wherein the rollers extend in a direction substantially parallel to the axle.

12. A vacuum cleaner comprising:
a housing;
an electric cable extending from the housing and providing elcetrical power from an electrical power source to the vacuum cleaner;
an axle fixedly supported by the housing;
a pendulous body supported by the axle for pivotal movement with respect to the axle and including two supporting elements spaced apart from one another;
at least a pair of rollers extending between the supporting elements and mounted for rotation with respect to the supporting elements, the cable extending between the axle and the rollers; and
wherein the rollers include at least two upper rollers and three lower rollers extending between the supporting elements and mounted for rotation with respect to the supporting elements, the cable extending between the lower rollers and the upper rollers.

* * * * *